(12) United States Patent
Renard et al.

(10) Patent No.: US 6,480,555 B1
(45) Date of Patent: Nov. 12, 2002

(54) METHOD AND APPARATUS FOR EXTENDED RANGE FREQUENCY CORRECTION BURST DETECTION

(75) Inventors: Kenneth A. Renard, Harvard; Priya S. Nadathur, Woodstock; James C. Baker, Crystal Lake, all of IL (US); Alexander W. Hietala, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/388,666

(22) Filed: Sep. 2, 1999

(51) Int. Cl.[7] .............................. H03D 1/00; H04L 7/00; H04J 3/06
(52) U.S. Cl. ..................... 375/340; 375/363; 370/526
(58) Field of Search ................. 375/340, 363, 375/364; 370/526

(56) References Cited

U.S. PATENT DOCUMENTS

| | | | | |
|---|---|---|---|---|
| 5,182,749 A | * | 1/1993 | Kazecki et al. ............ | 370/498 |
| 5,195,106 A | * | 3/1993 | Kazecki et al. ............ | 375/230 |
| 5,282,227 A | * | 1/1994 | Crawford .................... | 375/327 |
| 5,499,273 A | * | 3/1996 | Kull et al. .................. | 375/355 |
| 5,621,766 A | * | 4/1997 | Bakke et al. ............... | 375/340 |
| 5,940,748 A | * | 8/1999 | Daughtry, Jr. et al. ... | 455/182.2 |
| 5,974,098 A | * | 10/1999 | Tsuda ......................... | 375/340 |
| 6,229,991 B1 | * | 5/2001 | Hietala et al. .............. | 455/75 |

* cited by examiner

Primary Examiner—Chi Pham
Assistant Examiner—Tony Al-Beshrawi
(74) Attorney, Agent, or Firm—Brian M. Mancini

(57) ABSTRACT

A radio communication device provides extended burst tone detection for a demodulated I and Q input signal. The device includes a first burst detector coupled with the input signal and provides a first detection signal when a FCB tone is detected. A frequency shifter is coupled with the input signal and frequency translates the input signal by a predetermined amount. A second burst detector is coupled with the translated input signal and provides a second detection signal when a FCB tone is detected. A combiner is coupled with the first and second detection signals and indicates FCB tone detection when either of the first and second detection signals indicate FCB tone detection.

21 Claims, 6 Drawing Sheets

— PRIOR ART —

| OFFSET (IN kHz) | NEW DETECTOR IF CUTOFF = 73 kHz | NEW DETECTOR IF CUTOFF = 120 kHz | NEW DETECTOR DUAL SCAN IF CUTOFF = 73 kHz |
|---|---|---|---|
| -50 | 62 | 3 | 80 |
| -40 | 85 | 6 | 92 |
| -30 | 95 | 9 | 92 |
| -20 | 97 | 17 | 96 |
| -10 | 98 | 37 | 100 |
| 0 | 99 | 75 | 100 |
| 10 | 99 | 88 | 100 |
| 20 | 84 | 93 | 100 |
| 30 | 0 | 91 | 100 |
| 40 | 0 | 82 | 100 |
| 50 | 0 | 31 | 100 |

| OFFSET RANGE (IN kHz) | STATIC 3dB Eb/N0 | | | |
|---|---|---|---|---|
| | NEW DETECTOR | | CURRENT DETECTOR | |
| | GOOD | BAD | GOOD | BAD |
| [46,50] | 96 | 1 | | |
| [42,46] | 95 | 1 | | |
| [38,42] | 92 | 2 | | |
| [34,38] | 95 | 2 | | |
| [30,34] | 97 | 0 | | |
| [26,30] | 88 | 5 | | |
| [22,26] | 96 | 1 | 44 | 5 |
| [18,22] | 98 | 0 | 44 | 6 |
| [14,18] | 92 | 4 | 27 | 11 |
| [10,14] | 95 | 1 | 25 | 13 |
| [6,10] | 94 | 0 | 42 | 6 |
| [2,6] | 90 | 4 | 37 | 21 |
| [-2,2] | 95 | 1 | 45 | 14 |
| [-6,-2] | 92 | 1 | 38 | 62 |
| [-10,-6] | 95 | 2 | 43 | 29 |
| [-14,-10] | 95 | 1 | 52 | 18 |
| [-18,-14] | 88 | 4 | 42 | 30 |
| [-22,-18] | 96 | 1 | 44 | 19 |
| [-26,-22] | 95 | 1 | 53 | 23 |
| [-30,-26] | 93 | 1 | | |
| [-34,-30] | 96 | 1 | | |
| [-38,-34] | 96 | 1 | | |
| [-42,-38] | 89 | 0 | | |
| [-46,-42] | 96 | 1 | | |
| [-50,-46] | 96 | 0 | | |

*FIG. 7*

| OFFSET RANGE (IN kHz) | STATIC 10dB Eb/N0 | |
|---|---|---|
| | NEW DETECTOR | CURRENT DETECTOR |
| [46,50] | 0 | |
| [42,46] | 0 | |
| [38,42] | 0 | |
| [34,38] | 0 | |
| [30,34] | 0 | |
| [26,30] | 0 | |
| [22,26] | 0 | |
| [18,22] | 0 | 0 |
| [14,18] | 0 | 2 |
| [10,14] | 0 | 3 |
| [6,10] | 0 | 5 |
| [2,6] | 0 | 6 |
| [-2,2] | 0 | 4 |
| [-6,-2] | 0 | 1 |
| [-10,-6] | 0 | 21 |
| [-14,-10] | 0 | 7 |
| [-18,-14] | 0 | 6 |
| [-22,-18] | 0 | 12 |
| [-26,-22] | 0 | |
| [-30,-26] | 0 | |
| [-34,-30] | 0 | |
| [-38,-34] | 0 | |
| [-42,-38] | 0 | |
| [-46,-42] | 0 | |
| [-50,-46] | 0 | |

*FIG. 8*

METHOD AND APPARATUS FOR EXTENDED RANGE FREQUENCY CORRECTION BURST DETECTION

FIELD OF THE INVENTION

The present invention relates to a radio communication device and, more specifically, relates to a signal receiver using a burst detector to obtain a timing reference.

BACKGROUND OF THE INVENTION

A pulse communication receiver, such as a digital receiver or a radar receiver, must obtain a time reference to properly decode a received signal. A frequency burst can be detected in the received signal to provide the time reference. In a digital communication system, such as a GSM (Groupe Speciale Mobile) communication system, a burst of pure tone is periodically transmitted over a control channel. These bursts of tone are transmitted at a deterministic frequency offset from the channel center frequency (67.7 kHz above the center frequency in the GSM system) and are referred to as frequency correction bursts (FCBs). A timing reference for a channel band can be obtained by detecting the FCB at the deterministic frequency offset. Once an FCB has been detected, timing information can be extracted from the beginning or end of the FCB or other portions of the received signal, along with frequency information from the tone itself. This timing information can be used to synchronize the timing of a radiotelephone to a base station and to obtain timing for subsequent communications. Synchronization is required before detecting information to provide an output for the user of the receiver.

In a Time Division Multiple Access (TDMA) system such as in GSM, the FCB allows mobile units to align with the TDMA structure of the communication system as well as correct for any frequency offsets between the mobile unit and the base station by using the frequency information of the FCB tone. In order for these corrections to take place, the frequency location of the FCB must be determined with a high degree of accuracy.

When the transmitter and receiver have large frequency differences, the above timing correlation technique becomes unreliable. These large frequency differences can be caused by differences in the transmitter and receiver reference frequencies due to, for example, the crystal oscillator used as a master reference. Furthermore, a large frequency difference can be caused when the receiver moves relative to the transmitter at a large velocity. For example, an aircraft or a satellite is fast moving and typically would have Doppler frequency errors when communicating with a ground station or another aircraft or satellite. As the transmitter and receiver experience larger frequency differences, the received signal moves outside the range of correlation with the expected pattern. Thus, as the frequency difference increases, the received signal and expected pattern become increasingly decorrelated and hence it is more difficult to establish a timing reference.

For example, in the GSM system, frequency errors of the local oscillator (with respect to the base station) cause the FCB tone to appear at a frequency offset of 67.7+$f_d$ kHz, where $f_d$ is the frequency error between the mobile unit and the base station. Currently, with 900 MHz GSM radiotelephones, $f_d$ can take values up to ±25 kHz as the specified IF bandwidth is wide enough to detect frequencies up to 67.7±25 kHz. However, for dual band operation including operation at the DCS 1800 MHz band, the same local oscillator stability now results in a frequency range of ±50 kHz. Present FCB detectors have difficulty extending to a frequency of ±50 kHz range. Further, a frequency range of ±50 kHz can extend significantly outside of the available IF passband, as shown in FIG. 1, making detection doubly difficult.

One method of improving the situation is to improve the crystal oscillator stability of the radiotelephone. However, providing tighter tolerance crystal oscillators is quite costly. Another method to address this problem is to widen the IF bandwidth of the radiotelephone. However, widening the IF filter causes poor detection rates in the presence of adjacent channel interference. Another method is to use adaptive filtering where the IF filter tracks frequency signals, as is known in the art. However, this technique is limited to existing detection boundaries as established for the GSM standard and requires additional circuitry and produces unwanted signals.

What is needed is a method and apparatus to extend the frequency detection range of FCBs without: widening IF bandwidth or adjusting the frequency of the IF filter, requiring tighter tolerance crystal oscillators, or requiring additional circuitry. It would also be a benefit to provide an extended FCB detection range without performance degradation.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 7 is a table of result showing FCB detection performance, in accordance with the present invention;

FIG. 8 is a table of result showing null burst rejection, in accordance with the present invention;

DETAILED DESCRIPTION OF THE PREFERRED EMBODIMENT

The present invention provides a method and apparatus to extend the frequency detection range of FCBs without altering the IF bandwidth, requiring tighter tolerance crystal oscillators, or requiring additional circuitry. In addition, an extended FCB detection range is provided with improved FCB detection in the radiotelephone.

Figure 2:
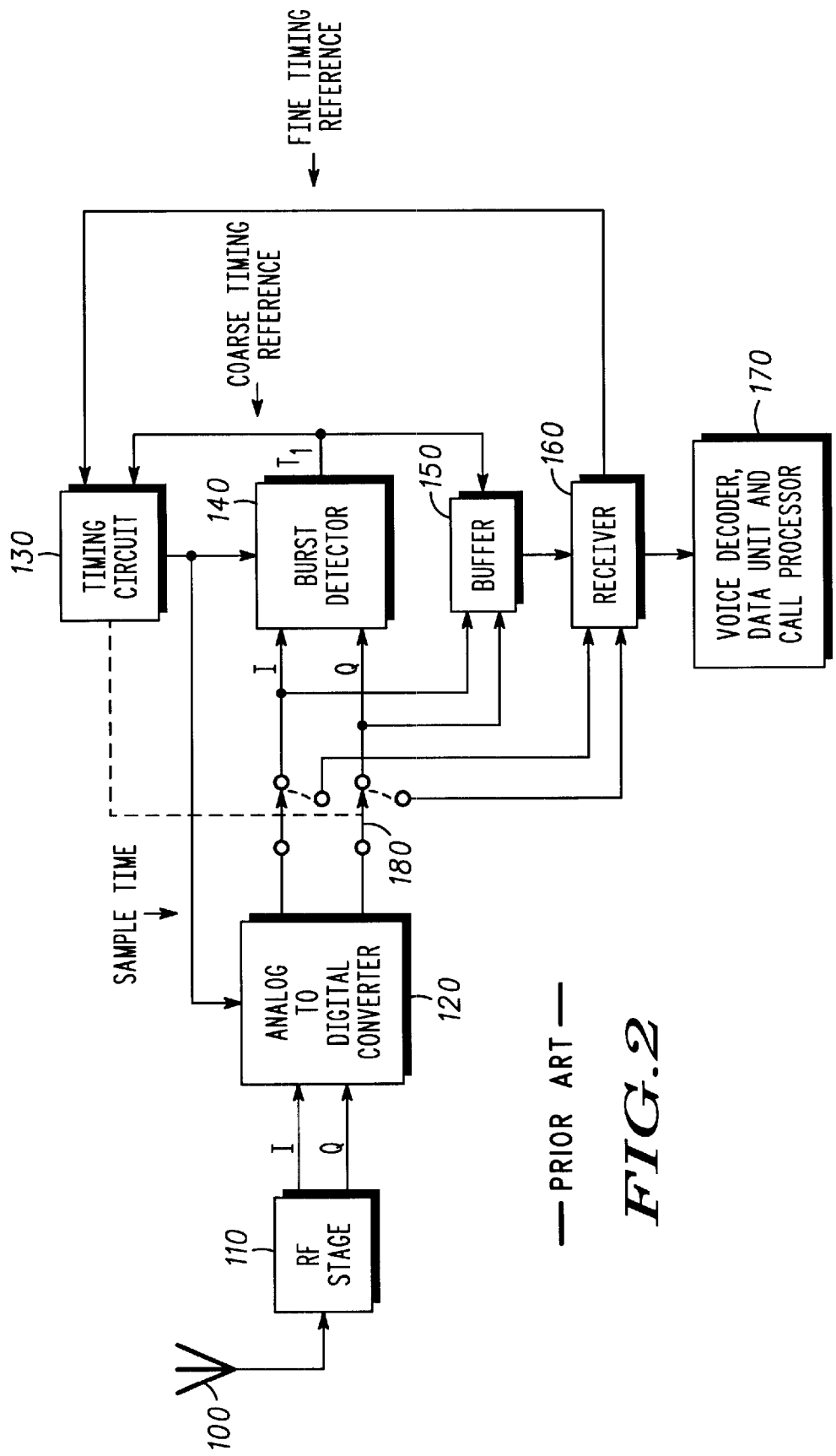
FIG. 2 is at simplified prior art block diagram of a radio communication device incorporating the present invention.

FIG. 2 illustrates a block diagram of a radio receiver with burst detection. Antenna 100 receives a radio frequency signal and a radio frequency (RF) stage 110 converts the radio frequency signal to an in-phase signal (I) and a quadrature signal (Q). An analog to digital converter 120 samples the in-phase signal and the quadrature signal to produce a digital in-phase signal and a digital quadrature signal in response to a sample timing from a timing circuit 130. A burst detector 140 establishes a coarse timing reference T1 in response to the digital in-phase signal and the digital quadrature signal from the analog to digital converter 120 and in response to the sample time from the timing circuit 130. The digital in-phase signal and the digital quadrature signal from the analog to digital converter 120 are stored in a buffer 150. Upon detection of a burst as indicated by the coarse timing reference T1 from the burst detector 140 the signals stored in the buffer 150 are transferred to a receiver 160. Thereafter, the receiver provides a fine timing reference to the timing circuit 130 and can deliver received data to a voice decoder, a data unit and a call processor 170, for example.

When the burst detector 140 detects a burst as indicated by the coarse timing reference T1, the timing circuit 130 causes a mode change from a burst detection mode to a gated receive mode. While in the burst detection mode, a timing reference has not yet been obtained by the burst detector 140 and information can not yet be extracted to provide an output for the user of the receiver. After a timing reference has been obtained by the burst detector 140, information can subsequently be obtained from the received signal by the receiver 160 under the assumption that the timing will be slowly varying. A mode switch 180 switches between the burst detection mode and the gated receive mode in response to the timing circuit 130. During the gated receive mode, slow variations in timing will be corrected by the receiver 160 via the fine timing reference. The receiver 160 generates the fine timing reference from its synchronization resulting from extracting information from the received signal to compensate for slow variations in timing. The RF stage 110 includes a local oscillator, mixer, and IF filter, as are known in the art. The receiver 160 includes a digital demodulator as is known in the art.

The timing circuit 130 provides the sample time to clock the sampling by the analog to digital converter 120 and also provides the sample time for digital circuits of the burst detector 140. The timing circuit 130 could contain, for example, a latch and a counter. Upon detection of the burst as indicated by the coarse timing reference T1, the latch will be triggered causing a mode change by the switch 180. The counter will reset and begin counting in response to the coarse timing reference T1 to generate the sample time for clocking of the analog to digital converter 120 and the burst detector 140. Alternatively, the analog to digital converter 120 can receive its timing from the master reference oscillator. Preferably, the burst detector incorporates digital signal processing functions such as are available in a digital signal processor (DSP), for example.

Figure 1:
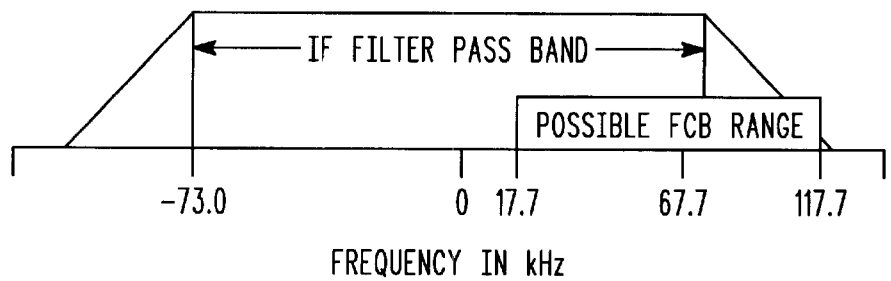
FIG. 1 is a prior art graphical representation of the typical range of FCB error in a 1800 MHz communication system.

FIG. 1 illustrates the expanded FCB error range of ±50 kHz in the recently available 1800 MHz frequency band. Local oscillator errors, for example, can shift the FCB tone within the range of ±50 kHz from the desired 67.7 kHz. Present FCB detectors have difficulty extending to a frequency of ±50 kHz range and are only reliable up to about ±25 kHz. The present invention provides a solution to this limit detection range problem.

Figures 3, 10:
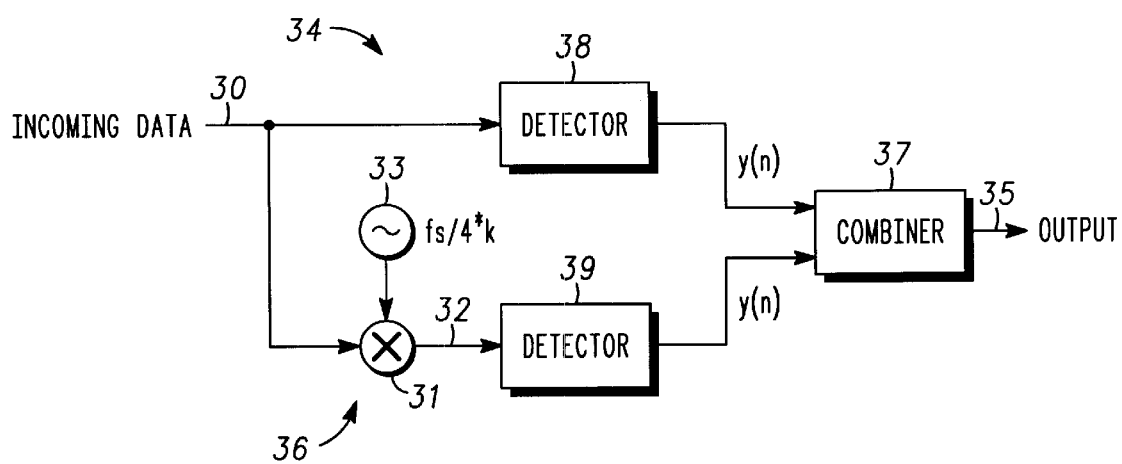
FIG. 3 is a simplified block diagram of a burst detector in accordance with the present invention.
FIG. 10 is a table of result showing performance gains, in accordance with the preferred embodiment of the present invention.

FIG. 3 shows an embodiment of the present invention providing an apparatus for extended range frequency correction burst detection of up to ±50 kHz. Expanding the detection range is accomplished by signal processing wherein the input signal 30 is modified to provide a frequency translated input signal 32, and then each of the frequency-translated and unmodified input signals 30,32 are run through individual detector branches 34,36. Each of the detector branches includes a FCB detector 38,39 which operate until one of the detectors 38,39 detects an FCB tone in either the frequency-translated or unmodified input signals 30, 32. The outputs of these two detectors 38,39 are combined in a combiner 37 that produces a single output signal 35 indicating successful FCB tone detection. The frequency-translated input signal 32 can be provided in hardware by an offset oscillator source 33 coupled through a mixer 31. However, it is preferred, and much simpler to provide the functionality of FIG. 3 via signal processing in a DSP. In this case, the frequency-translated signal is translated by multiplying by a complex tone generated using a sine-wave look-up table, as is known in the art.

In operation, the preferred embodiment of the present invention relates the phases of the in-phase (I) and quadrature (Q) branches of the incoming signal which comprises a downconverted Gaussian minimum shift keying (GMSK) signal received by the radio. The I and Q branches are multiplied and compared using the following formula:

$$\text{test}(n) = I(n)*I(n-k) + Q(n)*Q(n-k)$$

where n represents the present bit being tested and k represents the $k^{th}$ previous bit tested. This equation exploits the fact that during an FCB tone the value of test(n) will either become consistently positive (if the $n^{th}$ and the $n-k^{th}$ samples are separated by an even number of half cycles of the tone), or consistently negative (if the nth and the $n-k^{th}$ samples are separated by an odd number of half cycles of the tone).

Figure 4:
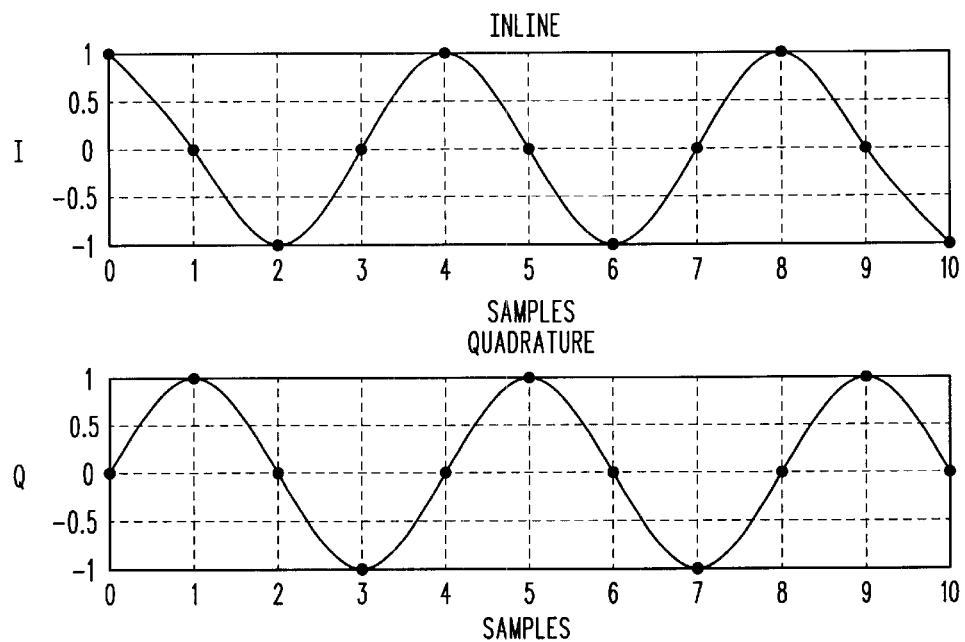
FIG. 4 is a graphical representation of the I and Q samples input into the burst detector of the present invention.

In practice, it was found that using k=6 provides optimum results. For example, let us look at the case where the n th and the $n-k^{th}$ samples are separated by exactly 3/2 cycles of the tone. This is illustrated in FIG. 4, which shows the I and Q components of a tone at a frequency of $f_s/4$. As can be seen, any $n^{th}$ sample value of the I branch is $\cos(\theta)$ and the $n-6^{th}$ sample value is thus $\cos(\theta-3\pi)=\cos(\theta)$. Likewise the corresponding Q samples are $\sin(\theta)$ and $-\sin(\theta)$, respectively. The value of test(n) is then, in effect, $-\cos(\theta)^2 -\sin(\theta)^2 = -1$, for any value of $\theta$ or n. This relationship is true regardless of the initial phase offset of the incoming signal. Correspondingly, the value of test(n) will be equal to 1 in the case where the $n^{th}$ and $n-6^{th}$ samples are separated by an even number of half-cycles of the tone. However, during randomly modulated data on the incoming signal, the value of test(n) will average close to zero, due to the fact that over randomly modulated data, the relationship between the current and delayed samples will be constantly changing.

Figure 5:
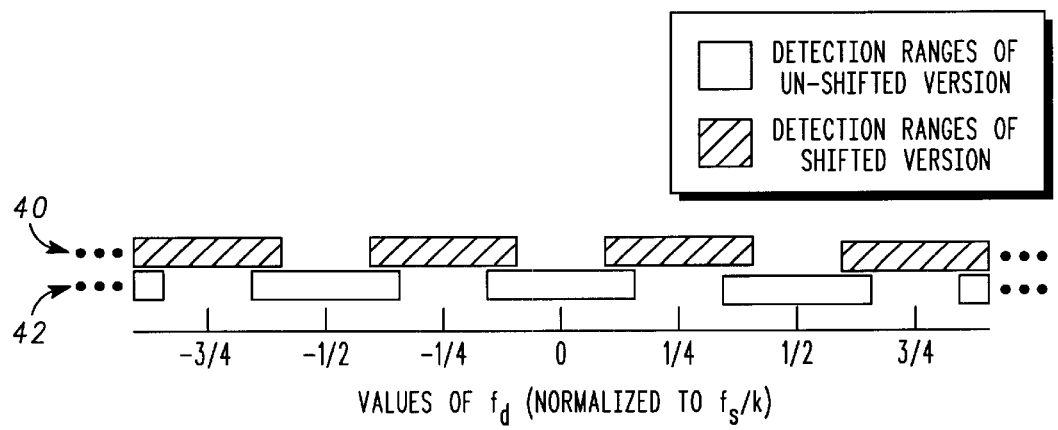
FIG. 5 is a graphical representation of the frequency ranges of the burst detector of the present invention.

Half-cycle boundaries are separated by exactly k samples when the frequency error of the FCB, $f_d$, is about equal to integer multiples of the quantity $f_s/(2*k)$ where $f_s$ is the bit clock rate, such as 270.833 kHz for a GSM system. Therefore, values of $f_d$ which fall near these half-cycle boundaries will be detected by the above equation. These detection ranges are represented by solid boxes 42 in FIG. 5. To detect values of $f_d$ which are not in the desired range (i.e. between half-cycle boundaries and where $f_d$ is not about equal to integer multiples of $f_s/(2*k)$), the detector is run over a second version of the input data which is translated in frequency by $f_s/(4*k)$. This frequency translation shifts the frequency ranges which would not originally be detected to ranges where the above equation is able to accurately detect the FCB tone. These shifted detection ranges are represented by hatched boxes as 40 in FIG. 5. The translation is accomplished in the DSP by using a sine-wave look-up table (as is known in the art) with 4*k entries. In effect, the signal processing provides two detectors: one that operates over the unshifted original input signal and a second that operates over the shifted version of the input signal. As a result the present invention is able to expand the available coverage of FCB detection range to ±50 kHz.

The outputs of the two detectors are compared or combined to produce the FCB detect indication output, 35 of FIG. 3. In each of the detectors 38,39, once the value of test(n) has been determined, it is passed through a leaky integrator (not shown) in the detectors 38,39. The leaky integrator gives emphasis to the trend of past samples of test(n) rather than an instantaneous value. This improves performance of the present invention by increasing its noise immunity. The outputs of the leaky integrators of each detector 38,39 is further processed by the DSP to ensure that a tone is being detected and not a null burst having the same structure as an FCB.

Figure 6:
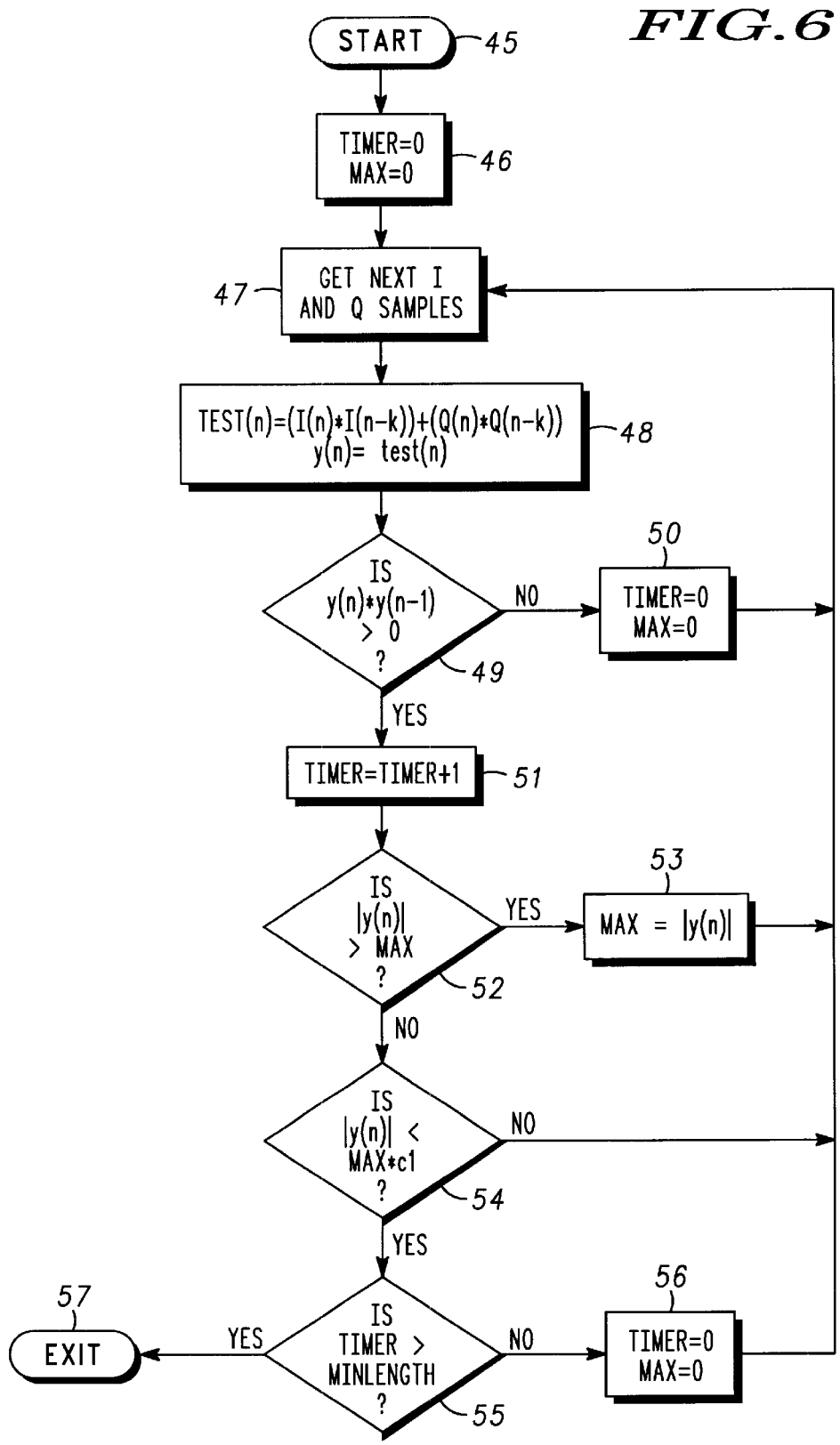
FIG. 6 is a simplified flow diagram illustrating operation of the present invention.

An FCB is detected not only by its pure tone signature but also by its predetermined duration (at least 35 cycles in a GSM system, for example). To properly detect an FCB tone the DSP operates on the leaky integrator output of each detector, y(n). The signal process utilized is shown in FIG. 6. At the start 45 two index variables, timer and max, are reset 46. I and Q samples are obtained 47, and the value of test(n) is calculated 48. In addition, the measure of the leaky integrator, y(n), is calculated. The signal processor must now make a decision based on y(n). To do this the value of y(n) is multiplied 49 by y(n−1). The result of this multiplication is used to determine if the two values have the same sign. If y(n)*y(n−1) is greater than zero, then a possible FCB tone is considered present. If a tone is not considered present then the timer and max values are reset 50 and the next I and Q samples are tested 47. If a tone is considered present then a timer is started 51 (incremented by one). The timer value is used to determine if the tone is of at least a sufficient duration to be a correct FCB tone. The signal processor now operates by looking for the end of the tone while the leaky integrator produces an increasingly non-zero or constantly high output, in accordance with a constant tone being present, before the end of tone occurs.

The signal processor compares 52 the absolute value of y(n) (as the value of test(n) can be either 1 or −1) to an threshold, max, to ensure that a constant tone is present. Optionally, if |y(n)| is greater than max, then max is set 53 to y(n), and testing of I and Q bits continues 47. At this point, |y(n)| is compared to a lesser threshold, max*c1, where c1 is a constant less than one. If |y(n)| is still over the minimum threshold 54, then the tone is still present and testing of I and Q samples 47 continues. Once |y(n)| falls below the minimum threshold (approaches zero), then it can be assumed that the tone has ended. The hysteresis between max and max*c1 improves the end of tone detection. The fact that max can adapt to the maximum value of y(n) allows FCB detection over a vast range of different signal magnitudes. The value of c1 can be modified to optimize FCB detection. A larger value of c1 makes the detector more likely to detect the FCB at the first sign of a tone being absent, while a smaller value of c1 requires a more distinct end of tone before positive detection.

Once an end of tone is detected 54, the signal processor checks 55 if the timer has been incremented over the predetermined duration, minlength, of an FCB tone. If the tone was not long enough, the index values of timer and max are reset and a new test of I and Q samples are begun 47. If the tone was long enough, then it is a valid FCB tone. Since two detectors are operating using the above methodology, a method is needed to combine the outputs of the two detectors (reference 37 in FIG. 3). The two outputs can be check to see if either output, y(n) is over a predetermined threshold. Preferably, the value of max from each detector is used, such that when one of the detectors detects the end of a tone, its max value must be greater than the max value of the other detector for the detect to be considered. Otherwise, the detector which detected is reset and the detect is ignored by the combiner. This eliminates multiple detections of the same tone at frequencies where the detection ranges of the two detectors overlap. In these overlap regions, only the detector with the strongest tone indication (largest max value) will be allowed to detect.

It should be recognized that the present invention can not only correct for local oscillator errors, but the start or end event of the FCB tone can be used as a timing reference to synchronize the timing of the radio to a basestation using techniques that are known in the art.

It is envisioned that the above methodology would only require operation at radio start up. Once the frequency error, $f_d$, has been determined the local oscillator can be adjusted accordingly and the signal processing can revert to only a single scan to maintain timing and frequency. So long as the local oscillator offset is within the range (±6 kHz) of the detection region centered about zero, the dual detection scheme will no longer be needed. In practice once the local oscillator is corrected it typically remains within a ±2 kHz window. Therefore, the present invention provides an advantage over prior art adaptive filter techniques since the same architecture is used for both the single and dual scan, whereas adaptive filter techniques require additional circuitry that is not needed most of the time.

FIG. 7 shows a table of results from a computer simulation where FCBs were randomly distributed (using a Gaussian distribution) within a ±50 kHz window, and detected using a current prior art adaptive filter detector and the new detector of the present invention without consideration of IF bandwidth limitations. Data was taken over one-hundred FCBs in each frequency range, each separated by one randomly modulated data burst. The tests were done using existing GSM interference models, as are known in the art, such as urban and hilly terrain at various mobile speeds, although the test results presented are for a static channel with no fading and 3 db Eb/No as being representative of the overall result. The other tests not represented all showed improved performance of the present invention, but were left out to limit the amount of data presented.

The first column of FIG. 7 shows the range of frequency errors expected from the FCBs, −50 to +50 kHz. The second column shows the percentage of FCBs accurately detected using the new detector of the present invention. A good detect is one where the FCB is located within fifteen samples of the actual FCB end. The third column shows the percentage of FCBs inaccurately detected using the new detector of the present invention. A bad detect is one where the FCB is located outside of fifteen samples of the actual FCB end. The fourth and fifth columns show comparable good and bad detects for the current prior art detector using the same definitions as above. Blank columns represent no detections made as the current detector cannot operate beyond a range of ±25 kHz. As can be seen the detector of the present invention perform not only over a larger frequency range, but also more accurately, than the current prior art detector.

Another important measure of detector performance is how well they do not detect bursts which are not actual FCBs. FIG. 8 shows a table of results from a computer simulation where null bursts (GSM data burst with all zeros for the data which is essentially an FCB which is interrupted in the middle by a 26 bit training sequence) were randomly distributed (using a Gaussian distribution) within a ±50 kHz window, and detected using the current prior art detector compared with the new detector of the present invention. It is important that detectors do not detect these null bursts as FCBs. Data was taken over two-hundred FCBs. The tests were done using existing GSM interference models, as are known in the art, such as urban and hilly terrain at various mobile speeds, although the test results presented are for a static channel with no fading and 3 db Eb/No as being representative of the overall result. The other tests not represented all showed improved performance of the present invention, but were left out to limit the amount of data presented.

The first column of FIG. 8 shows the range of frequency offsets ranging from −50 to +50 kHz. The second column shows the percentage of null bursts detected as FCBs using the new detector of the present invention. The third column shows the percentage of null bursts detected as FCBs using the current adaptive filter detector. As can be seen the detector of the present invention performs not only over a larger frequency range, but also more accurately, than the current prior art detector.

A larger usable frequency range should also consider IF filter bandwidth limitations. For example, FIG. 1 illustrates the expanded FCB error range of ±50 kHz in the newly available 1800 MHz frequency band. Local oscillator errors, for example, can shift the FCB tone within the range of ±50 kHz from the desired 67.7 kHz. At −50 kHz offset this is not a problem, but at the upper extreme of +50 kHz the FCB tone would be outside of the IF bandwidth and substantially undetectable. The usable range of FCB detection in this case is about −50 kHz to +20 kHz from ideal.

A preferred embodiment of the present invention solves this problem by providing for a dual scan of the input signal having a first scan that operates on the original unmodified input signal and a second scan that operates on a frequency-shifted version of the input signal. For each scan, the FCB detector of the present invention operates on an incoming signal from the analog-to-digital converters in a radiotelephone receiver. Preferably, the second scan shifts the input signal about −30 kHz to just make up for the limited range of the IF bandwidth without incurring problems with adjacent channel interference. This dual scan approach ensures that every possible FCB tone will be brought into the range of the detection bandwidth. This is accomplished without widening the IF bandwidth of the filter or adjusting the IF filter center frequency, as FCB tones outside of the predetermined IF bandwidth will be shifted within the detection bandwidth. If the IF selectivity is done prior to the ADC, as is preferred, then the frequency is shifted by changing the local oscillator frequency. Alternatively, if the final IF selectivity is done digitally, then it is possible to perform the frequency shifting digitally.

Figure 9:
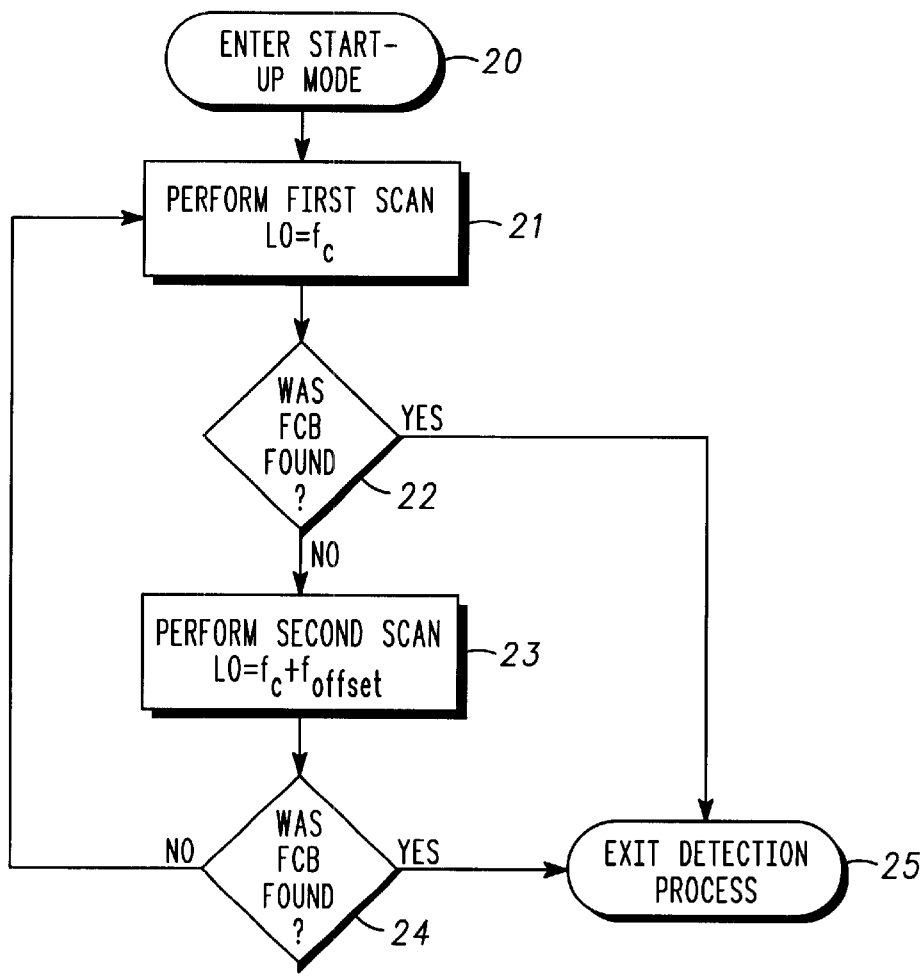
FIG. 9 is a simplified flow diagram illustrating operation of a preferred embodiment of the present invention.

Referring to FIG. 9, in a preferred embodiment of the present invention, the first and second scans are processing steps using the same FCB detector. In operation, at start-up or wake-up 20 the radiotelephone powers up the necessary detection circuitry. In a first detection step, the FCB detector performs a first scan 21 of an input signal with the local oscillator set at its nominal center frequency, $f_c$. In the presence of an IF filter with a cutoff frequency of approximately 73 kHz (shown in FIG. 1), tuning the local oscillator to the center frequency of the channel will allow detection of FCBs for values of frequency error, $f_d$, ranging from −50kHz to approximately +20 kHz. In cases where $f_d$ is greater than 20 kHz, the IF filter will substantially prevent the FCB from being detected. A decision is made 22 as to whether the FCB detector of the present invention has found an FCB. If an FCB is found, the process ends 25 and the radio telephone goes on with its subsequent processing as normal. If an FCB is not found, a second scan 23 is done on a frequency-shifted input signal by having the local oscillator set at an offset center frequency, $f_c+f_{offset}$. A decision is made 24 as to whether the FCB detector has found an FCB on the second scan. If an FCB is found, the process ends 25 and the radio telephone goes on with its subsequent processing as normal. If an FCB is not found, the FCB detector returns to step 21 to continue scanning the input signal.

Preferably, the second scan shifts the input signal about −30 kHz ($f_{offset}$=+30 kHz) to just make up for the limited range of the IF bandwidth without incurring problems with adjacent channel interference. For this case FCBs having a maximum error of +50 kHz will be brought into the passband of the IF filter and will be detected.

The dual scan approach of the preferred embodiment ensures that every possible value of $f_d$ will be brought into the range of the detector. This is accomplished without widening the bandwidth of the IF filter or adjusting its center frequency, as FCBs outside of the range of the IF filter bandwidth will be shifted in frequency so that they are within the passband of the IF filter.

In cases of extreme fading or interference, a FCB may be detected in a second scan, and not in a first scan, even though the frequency of the FCB is within the range of the first scan. Normally, this would result in an incorrect calculation for $f_d$. For example, if a FCB is at +17 kHz from nominal, but is missed by the first scan, the second scan (with $f_{offset}$=+30 kHz) would show the FCB at an incorrect frequency of −13 kHz from nominal. The present invention mitigates this problem by multiplying and comparing the phase relationships (signs) of the I and Q bits of the input signal (from the GMSK modulated GSM signal). For two bits, n and n+1, if I(n)*I(n+1)<0 and if I(n)*Q(n+1)<0 then the frequency from nominal is positive. Otherwise the frequency is negative. Preferably, this test is done for several zero-crossings of the input signal to minimize errors.

FIG. 10 shows a table of results from a computer simulation where FCBs where randomly distributed (using a Gaussian distribution) within a ±50 kHz window, and detected using the detector of the present invention in consideration of IF bandwidth limitations. The tests were done using existing GSM interference models, as are known in the art. The first column of FIG. 10 shows the range of frequency errors expected from the FCBs, −50 to +50 kHz. The second column shows the percentage of FCBs detected using the FCB detector of the present invention and having an IF cutoff=73 kHz. The third column shows the percentage of FCBs detected using the FCB detector of the present invention and allowing the IF filter cutoff to expand to 120 kHz. Although this expands the range of detection, accuracy is reduced and adjacent channel interference becomes a problem. The last column shows the percentage of FCBs detected using the preferred dual scan FCB detector method of the present invention with a fixed IF cutoff of 73 kHz. As can be seen, the preferred dual scan FCB detector method of the present invention provides much broader and accurate detection of FCBs than the prior art in view of IF bandwidth limitations.

Although the invention has been described and illustrated in the above description and drawings, it is understood that this description is by example only, and that numerous changes and modifications can be made by those skilled in the art without departing from the broad scope of the invention. Thus the outputs; of the timing circuit 130 may be required by different circuits and not needed by all others. Although the present invention exhibits Doppler shift tolerance, the present invention provides additional advantages as mentioned herein and is thus applicable to all radio communications systems regardless of the need for Doppler shift tolerance such as paging, cellular and satellite communication system receivers.

What is claimed is:

1. A method of extending a frequency range of burst tone detection in a radio communication device, the method comprising the steps of:

providing a communication device including a local oscillator, a digital demodulator, an IF filter, a receiver and a FCB tone detector operable on an input signal having an FCB tone;

shifting the input signal by a predetermined frequency offset to provide a translated input signal;

applying the input signal to a first FCB tone detector and the translated input signal to a second FCB tone detector;

sampling the input signal such that, when the frequency error of the FCB is about equal to integer multiples of the quantity $f_s/(2*k)$ where $f_s$ is the bit clock rate and k is the distance between tested samples and samples of the input signal are taken near half-cycle boundaries of the input signal, a FCB tone is detected;

sampling the translated input signal such that, when the frequency error of the FCB is between integer multiples of the quantity $f_s/(2*k)$ and samples of the translated input signal are taken between half-cycle boundaries of the input signal, a FCB tone is detected combining outputs from the FCB detectors to provide a single output signal indicating a detected FCB tone.

2. The method of claim 1, wherein the input signal of the providing step comprises downconverted I and Q bits from a signal received by the device, and wherein the detecting step includes, for each detection branch, substeps of:

integrating the calculation $$\text{test}(n)=I(n)*I(n-k)+Q(n)*Q(n-k)$$

over time to provide a detection variable, wherein n and k are separated by an integer multiple of half cycles of a FCB tone, such that the detection variable will become increasingly non-zero in the presence of a tone having the characteristics of a FCB tone;

timing the duration of the presence of the tone;

simultaneously observing when the detection variable begins to approach zero signifying the end of the tone;

ending the timing step and calculating a total time duration of the presence of the tone; and comparing the total time duration to a known duration of a FCB tone so as to confirm that the tone was an actual FCB tone.

3. The method of claim 2, wherein the integrating step includes leaky integration so as to give emphasis to the trend of past samples of test(n) over an instantaneous value of test(n), thereby increasing noise immunity.

4. The method of claim 2, wherein the integrating step includes ensuring that the detection variable when multiplied by an immediately previous value is greater than zero.

5. The method of claim 2, wherein the observing step includes ensuring that the absolute value of the detection variable stays above a first threshold continuously during the presence of the tone.

6. The method of claim 2, wherein the observing step includes ensuring that the absolute value of the detection variable stays above a first adaptive threshold continuously during the presence of the tone, and wherein the first adaptive threshold is adjusted to equal the absolute value of a previous maximum value of the detection variable.

7. The method of claim 6, wherein the observing step includes observing when the absolute value of the detection variable falls below a second adaptive threshold signifying the end of the tone, wherein the second threshold is less than the first threshold by a predetermined scaled amount.

8. The method of claim 2, wherein the combining step includes comparing the maximum value of the detection variable from each detection branch such that when one of the detection branches observes the end of a tone in the observing step, the detection branch with the higher maximum detection value is the only branch considered for providing the single output signal indicating a detected FCB.

9. The method of claim 1, wherein the shifting step includes multiplying the input signal with fs/(4*k) to provide the translated input signal.

10. The method of claim 1, wherein during the sampling steps if a FCB tone is not detected, further comprising the steps of:

translating the input signal by adjusting the local oscillator by a predetermined offset translate FCB tone to lie substantially within a bandwidth the IF filter; and repeating the sampling steps.

11. A radio communication device including a local oscillator, a digital demodulator, an IF filter, and a receiver, the device including an extended frequency range FCB tone detector operable on an input signal having an FCB tone, the detector comprising:

a first burst detection branch operable to sample the input signal, the first burst detection branch provides a first detection signal when the frequency error of the FCB is about equal to integer multiples of the quantity $f_s/(2*k)$ where $f_s$ is the bit clock rate and k is the distance between tested samples and samples of the input signal are taken near half-cycle boundaries of the input signal;

a frequency shifter coupled with the input signal, the frequency shifter translating the input signal by a predetermined frequency offset to produce a translated input signal;

a second burst detection branch operable to sample the translated input signal, the second burst detection branch provides a second detection signal when the frequency error of the FCB is between integer multiples of the quantity $f_s/(2*k)$ and samples of the translated input signal are taken between half-cycle boundaries of the input signal; and a combiner coupled with the first and second detection signals, the combiner indicating FCB tone detection when either of the first and second detection signals indicate FCB tone detection.

12. The device of claim 11, wherein the predetermined amount of frequency translation is provided by multiplying the input signal with fs/(4*k).

13. The device of claim 11, wherein the first and second burst detection branches utilize the same burst detector operable at different times.

14. The device of claim 11, wherein the input signal is downconverted I and Q bits from a signal received by the device, each detection branch integrates a value $$test(n)=I(n)*I(n-k)+Q(n)*Q(n-k)$$

over time to provide a detection variable, wherein n and k are separated by an integer multiple of half cycles of a FCB tone, such that the detection variable will become increasingly non-zero in the presence of a tone having the characteristics of a FCB tone, when the detection variable begins to approach zero signifying the end of the tone the total time duration of the tone is compared to a known duration of a FCB tone to confirm that the tone was an actual FCB tone.

15. The device of claim 14, wherein each detection branch provides leaky integration so as to give emphasis to the trend of past samples of test(n) over an instantaneous value of test(n), thereby increasing noise immunity.

16. The device of claim 14, wherein, when the sign of the detection variable changes, a tone is no longer considered present.

17. The device of claim 14, wherein the absolute value of the detection variable is compared to a first threshold continuously during the presence of the tone.

18. The device of claim 14, wherein the FCB tone is indicated as detected when the absolute value of the detection variable stays above a first adaptive threshold continuously, and wherein the first adaptive threshold is adjusted to equal the absolute value of a previous maximum value of the detection variable.

19. The device of claim 18, wherein the tone is ended when the absolute value of the detection variable falls below a second adaptive threshold, wherein the second threshold is less than the first threshold by a predetermined scaled amount.

20. The device of claim 14, wherein when either detection branch indicates an end of tone, the detection branch with the higher maximum detection value is used to provide the single output signal indicating a detected FCB.

21. The device of claim 11, wherein when the FCB tone lies outside of a bandwidth the IF filter, the device is operable to adjust the local oscillator by a predetermined offset to translate the FCB tone to lie substantially with a fixed bandwidth of the IF filter and the detector is operable on the translated FCB tone.

\* \* \* \* \*